United States Patent [19]

Smart et al.

[11] Patent Number: 5,579,070
[45] Date of Patent: Nov. 26, 1996

[54] ONE-TIME-USE CAMERA HAS DRIVER FOR CLOSING FILM CASSETTE WHICH IS BROKEN TO DISABLE CAMERA AFTER COMPLETED USE

[75] Inventors: David C. Smart; Douglas H. Pearson, both of Rochester, N.Y.

[73] Assignee: Eastman Kodak Company, Rochester, N.Y.

[21] Appl. No.: 590,666

[22] Filed: Jan. 24, 1996

[51] Int. Cl.[6] .................................................. G03B 17/30
[52] U.S. Cl. ............................ 396/538; 396/535; 396/513
[58] Field of Search .................................... 354/174, 212, 354/213, 214, 215, 277, 288

[56] References Cited

U.S. PATENT DOCUMENTS

| 4,751,536 | 6/1988 | Ohmura et al. | 354/75 |
| 5,231,438 | 7/1993 | Smart | 354/281 |
| 5,235,366 | 8/1993 | Kucmerowski | 354/212 |
| 5,357,303 | 10/1994 | Wirt | 354/275 |
| 5,359,378 | 10/1994 | Zander et al. | 354/275 |
| 5,452,033 | 9/1995 | Balling et al. | 354/212 |
| 5,517,720 | 5/1996 | Balling | 354/288 |

Primary Examiner—Michael L. Gellner
Assistant Examiner—John Chizmar
Attorney, Agent, or Firm—Roger A. Fields

[57] ABSTRACT

A camera for use with a film cassette having a movable light lock supported within a film egress/ingress slot to be moved closed after a filmstrip is wound into the cassette, comprises a cassette-receiving chamber, and a movable driver to be moved to close the light lock before the cassette is removed from the chamber. An exterior ingress opening to the chamber is provided to admit an insertion tool into the chamber to push the cassette out of the chamber. The driver has a weakened portion and is located for the tool to push the driver to force the cassette out of the chamber. Fixed means is located to break the weakened portion during movement of the driver, whereby the camera will be disabled.

5 Claims, 6 Drawing Sheets

ONE-TIME-USE CAMERA HAS DRIVER FOR CLOSING FILM CASSETTE WHICH IS BROKEN TO DISABLE CAMERA AFTER COMPLETED USE

CROSS-REFERENCE TO RELATED APPLICATIONS

Reference is made to commonly assigned copending applications Ser. No. 08/371336, entitled APPARATUS AND METHOD FOR CLOSING LIGHT LOCK OF FILM CASSETTE AND UNLOADING CASSETTE FROM CAMERA and filed Jan. 11, 1995 in the names of David C. Smart and Thomas E. Dussinger, Ser. No. 08/590,968, entitled CAMERA WITH FILM SENSOR AND DRIVER TO INITIATE CLOSING OF CASSETTE RESPONSIVE TO RETURN OF FILMSTRIP TO CASSETTE and filed Jan. 24, 1996 in the names of David C. Smart and Douglas H. Pearson, Ser. No. 08/590,662, entitled ONE-TIME-USE CAMERA HAS DRIVER FOR CLOSING FILM CASSETTE WHICH IS REMOVED WITH CLOSED CASSETTE TO DISABLE CAMERA AFTER COMPLETED USE and filed Jan. 24, 1996 in the names of David C. Smart and Douglas H. Pearson, Ser. No. 08/590,717, entitled ONE-TIME-USE CAMERA UNCOVERS INGRESS OPENING FOR INSERTION TOOL TO EJECT CASSETTE WHEN CASSETTE CLOSED and filed Jan. 24, 1996 in the names of David C. Smart and Thomas E. Dussinger, Ser. No. 08/590,792, entitled CAMERA WITH MANUAL FILM REWIND LOCKED WHEN CASSETTE CLOSED, PREFERABLY TO POSITION FILM EXPOSED INDICATOR IN WINDOW OF CASSETTE and filed Jan. 24, 1996 in the names of David C. Smart and Thomas E. Dussinger, and Ser. No. 08/590,719, entitled ONE-TIME-USE CAMERA WITH LID FLEXED TO UNCOVER CHAMBER WHEN CASSETTE FORCIBLY EJECTED FROM CHAMBER and filed Jan. 24, 1996 in the names of David C. Smart and Ralph M. Lyon.

FIELD OF THE INVENTION

The invention relates generally to the field of photography, and in particular to cameras to be used with film cassettes that can be opened and closed. More specifically, the invention relates to a one-time-use camera that has a driver for closing the film cassette which is broken to disable the camera after completed use.

BACKGROUND OF THE INVENTION

Commonly assigned prior art U.S. Pat. No. 5,357,303, issued Oct. 18, 1994, discloses a film cassette having a light lock which is pivoted closed to prevent ambient light from entering the cassette interior and is pivoted open to permit film movement out of and into the cassette interior. An implement or tool is designed to engage the light lock to pivot it open and closed.

Commonly assigned prior art U.S. Pat. No. 5,231,438, issued Jul. 27, 1993, discloses a camera intended for use with a film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

SUMMARY OF THE INVENTION

A camera for use with a film cassette having a movable light lock supported within a film egress/ingress slot to be moved closed after a filmstrip is wound into the cassette, comprises a cassette-receiving chamber, and a movable driver to be moved to close the light lock before the cassette is removed from the chamber, and is characterized in that:

an exterior ingress opening to the chamber is provided to admit an insertion tool into the chamber to push the cassette out of the chamber;

the driver has a weakened portion and is located for the tool to push the driver to force the cassette out of the chamber; and fixed means is located to break the weakened portion during movement of the driver, whereby the camera will be disabled.

Thus, the invention is particularly helpful when the camera is a one-time-use type. In this instance, it is desirable to break some component of the camera to prevent unauthorized recycling of the camera. A camera that is recycled in an unauthorized way may be of lesser quality.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
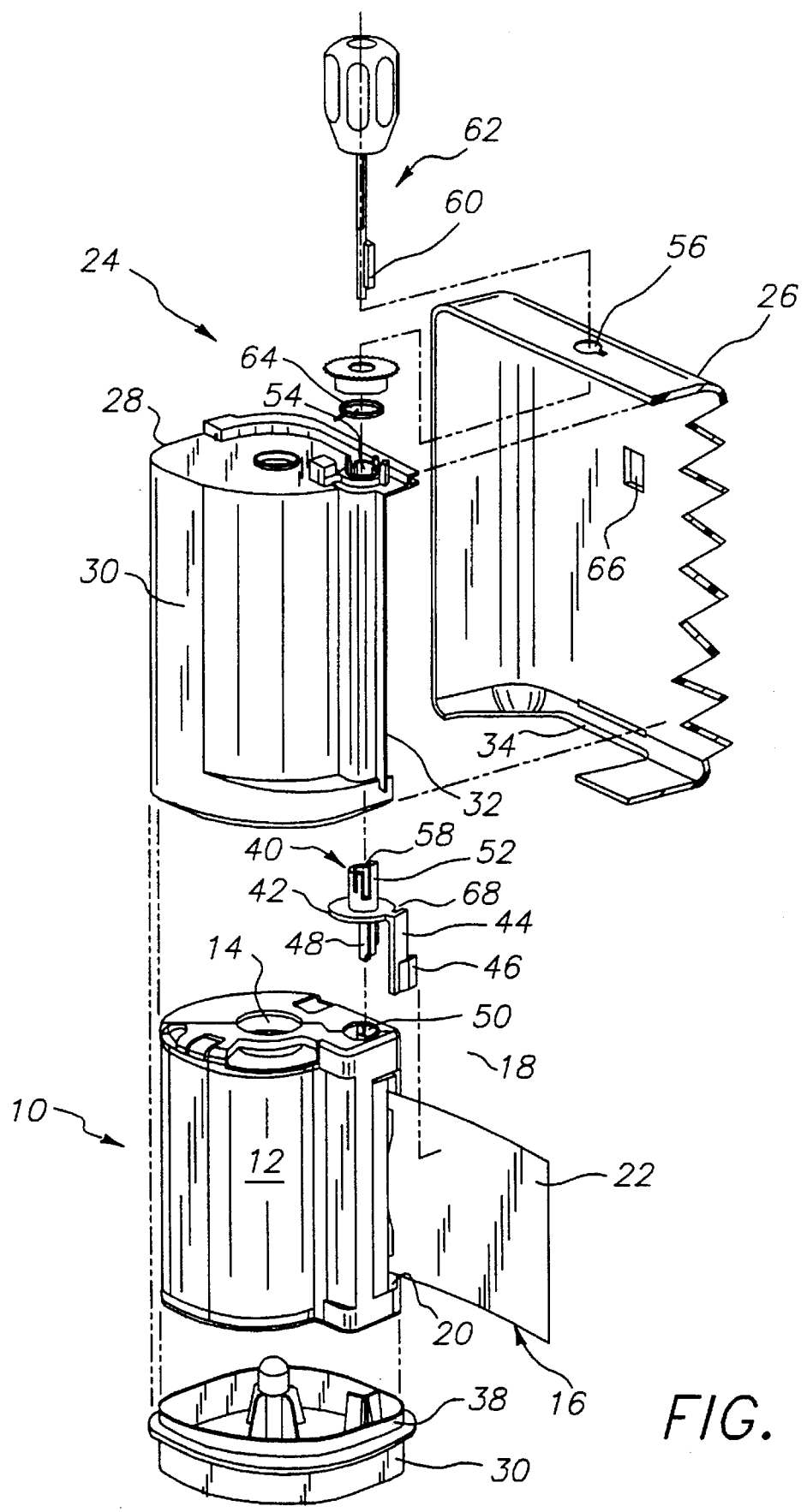
FIGS. 1, 2 and 3 are front perspective views of a partially shown one-time-use camera according to a preferred embodiment of the invention, depicting operation of the preferred embodiment.
Figure 2:
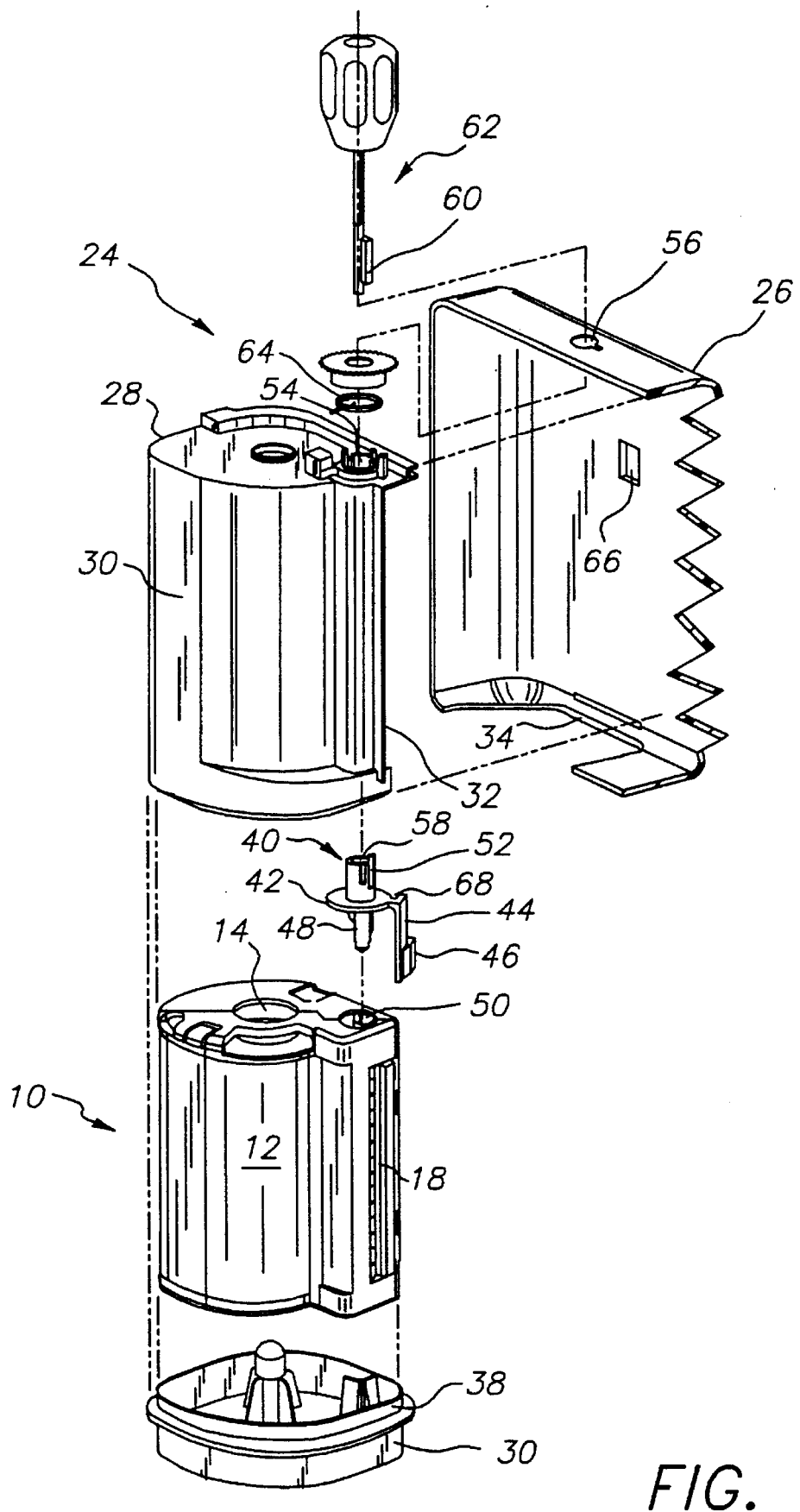
Figure 3:
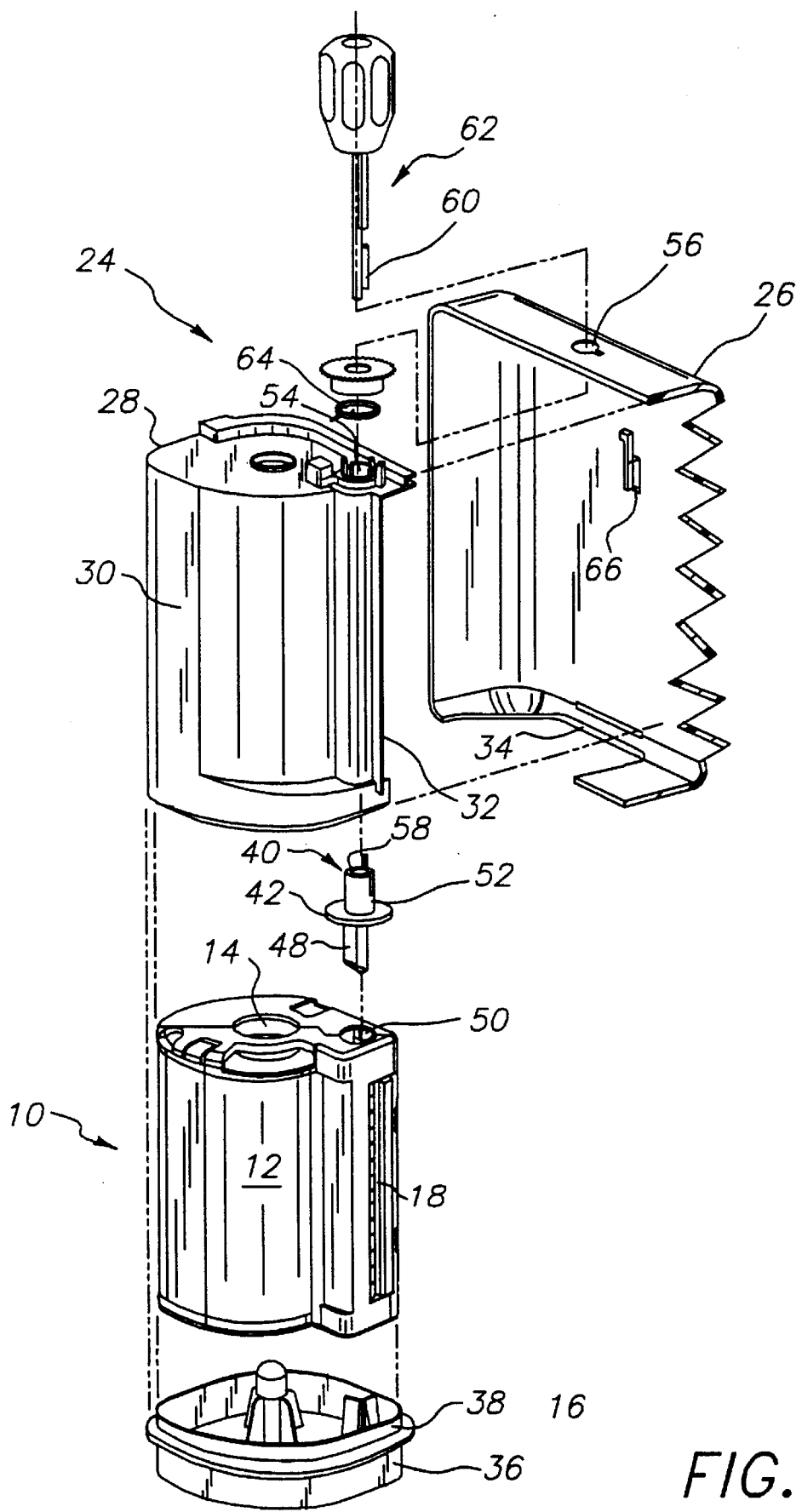

Preferred Embodiment (FIGS. 1–3)

Referring now to the drawings, FIG. 1 shows a film cassette 10 similar in operation to ones disclosed in prior art U.S. Pat. Nos. 5,357,303, issued Oct. 18, 1994, and No. 5,231,438, issued Jul. 27, 1993. The film cassette 10 includes a cassette shell 12 that contains a flanged spool 14 on which is stored a wound unexposed/exposed filmstrip 16. A slightly elastic light lock 18 is supported within a film egress/ingress slot 20 in the cassette shell 12 to be pivoted open to permit film movement out of and back into the shell, through the slot, and to be pivoted closed to prevent ambient light from entering the shell, through the slot.

FIG. 1 shows the light lock 18 open and all but a trailing film end portion 22 of the filmstrip 16 wound into the cassette shell 12 after the filmstrip is exposed outside the cassette shell. FIGS. 2 and 3 show the light lock 18 pivoted closed after the trailing film end portion 22 is wound into the cassette shell 12.

A partially shown one-time-use camera 24 with which the film cassette 10 is to be used includes a rear cover or back 26 and a chamber cover 28 which, together, form a cassette chamber 30 for the film cassette. During manufacture of the one-time-use camera 24, the film cassette 10 is placed in the chamber cover 28. Then, the chamber cover 28 is attached to the rear cover 26. A film egress/ingress slot 32 is located between the chamber cover 28 and the rear cover 26, opposite the film egress/ingress slot 20 in the cassette shell 12, to permit film movement out of and back into cassette chamber 30.

The rear cover 26 has a bottom opening 34 that is aligned with a similar opening (not shown) in the chamber cover 28 to permit the film cassette 10 to be removed from the cassette chamber 30 after the filmstrip 16 is exposed in the one-time-use camera 24 and returned to the cassette shell 12. A bottom lid 36 normally covers the bottom opening 34. The bottom lid 36 has a thin peripheral lip 38 that is snugly received within the bottom opening 34 to removably hold the lid in place to close the bottom opening.

An actuator unit 40 for pivoting the light lock 18 closed when the trailing film end 22 is wound into the cassette shell 12 comprises an integral single-piece driver 42 and film sensor lever 44. The film sensor lever 44 has a sensor head 46 shown in FIG. 1 in contact with the trailing film end portion 22. The driver 42 has a depending drive-part 48 engaging a top exposed axial end 50 of the light lock 18 to pivot the light lock closed, and an upstanding key-part 52 that protrudes slightly from a top opening 54 in the chamber cover 28.

A top ingress opening 56 in the rear cover 26 is located coaxially above a drive hole 58 in the key-part 52 of the driver 42 as shown in FIG. 1. The ingress opening 56 and the drive hole 58 are similarly configured as keyways to successively receive a keyed forward end 60 of a manual insertion tool 62 when the drive hole is aligned with the ingress opening as shown in FIG. 2. In particular, the ingress opening 56 and the drive hole 58 each have a circular portion and a radial slot portion which define the keyways, and the keyed forward end 60 of the tool 62 is complementarily shaped.

Operation

Going from FIG. 1 to FIG. 2, it can be seen that when the trailing film end portion 22 is wound into the cassette shell 12, a return torsion spring 64 that biases the sensor head 46 of the film sensor lever 44 against the trailing film end portion, in order to enable the sensor head to determine the presence and absence of the filmstrip 16 outside the cassette shell, urges the actuator unit 40 to rotate counter-clockwise in FIG. 2. Consequently, the film sensor lever 44 is similarly rotated to pivot its sensor head 46 snugly into an interior faceted cavity 66 in the rear cover 26, the drive-part 48 is similarly rotated to pivot the light lock 18 partially closed about 60%, and the key-part 52 is similarly rotated to align its drive hole 58 with the ingress opening 56. The cavity 66 acts as a stop to limit rotation of the actuator unit 42, in order to align the drive hole 58 with the ingress opening 56.

Since the drive hole 58 is aligned with the ingress opening 56, the keyed forward end 60 of the tool 62 can now be manually inserted completely through the ingress opening 56 and into the drive hole 58. Then, the tool 62 is manually rotated counter-clockwise in FIG. 3 to similarly rotate the driver 42. Consequently, the drive-part 48 is similarly rotated to pivot the light lock 18 further closed 40% to completely close the light lock, and the film sensor lever 44 (whose sensor head 46 is captured in the cavity 66) is broken away from the driver 42 at a weakened interconnection 68. Slightly over-rotating the drive part 48 will not harm the light lock 18 due to the elasticity of the light lock. Then, the tool 62 is manually pushed downward to force the driver 42 out of the cassette chamber 30 with the film cassette 10 through the bottom opening 34. The film cassette 10 is pushed against the bottom lid 36 to pop the bottom lid away from the bottom opening 34. See FIG. 3.

When the driver 42 and the film sensor lever 44 are broken apart from one another, and the driver is removed from the one-time-use camera 24 with the film cassette 10 and discarded, reuse of the actuator unit 40 is effectively precluded. This is appropriate to prevent unauthorized recycling of the one-time-use camera 24. An unauthorized recycled camera may be of lesser quality than an authorized recycled camera.

Figure 4:
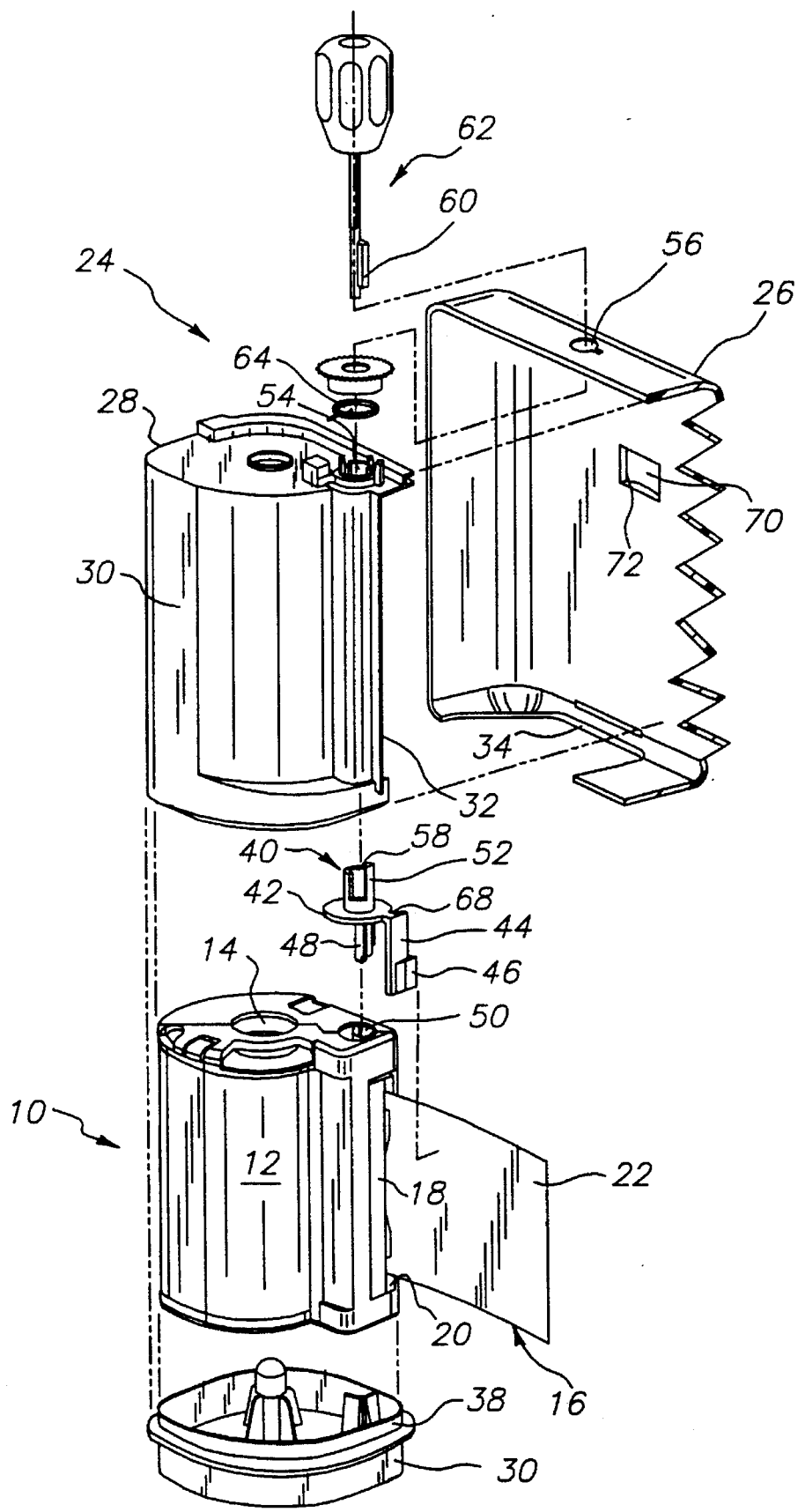
FIGS. 4, 5 and 6 are front perspective views of a partially shown one-time-use camera according to an alternate embodiment of the invention, depicting operation of the alternate embodiment.
Figure 5:
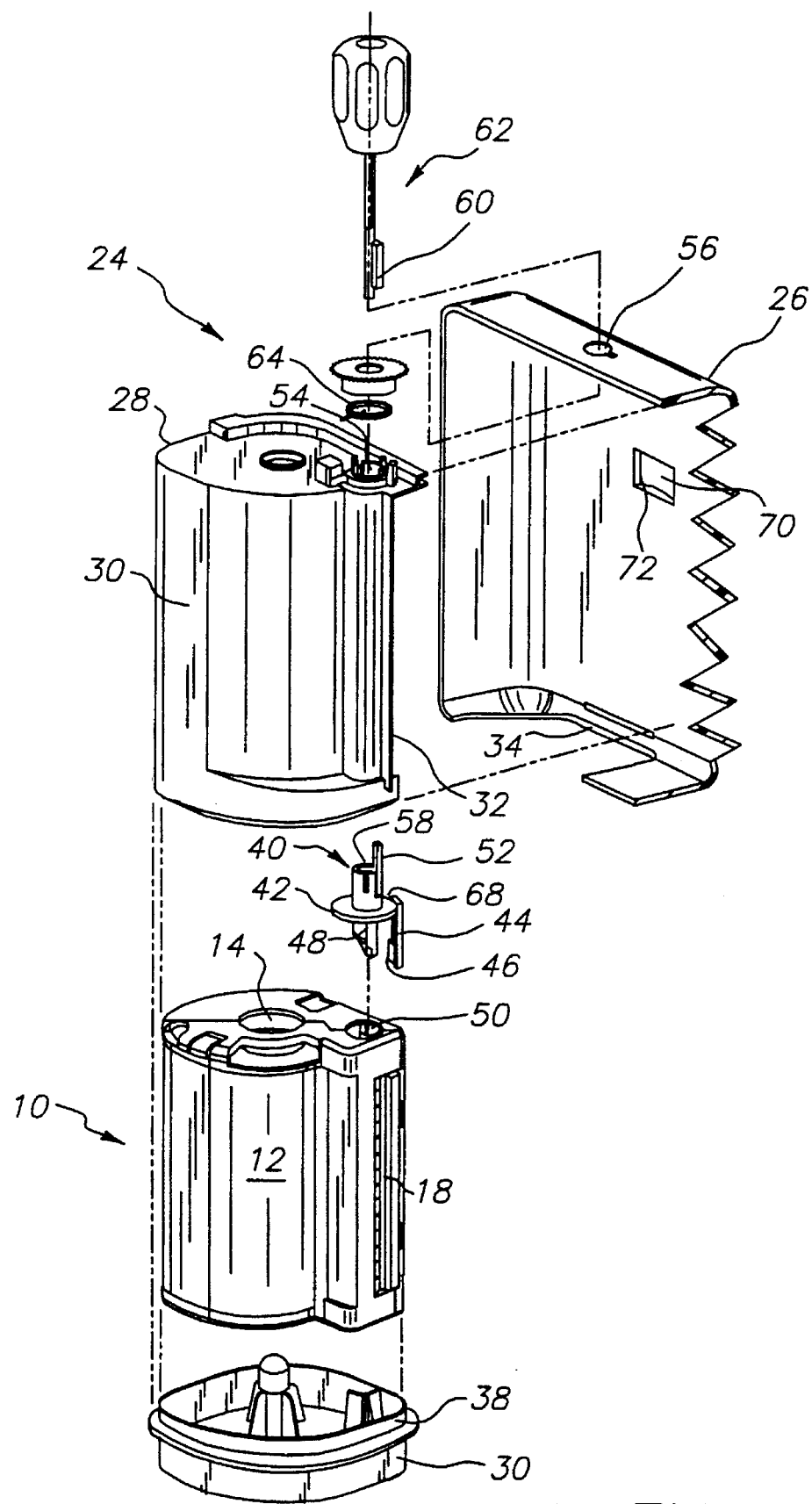
Figure 6:
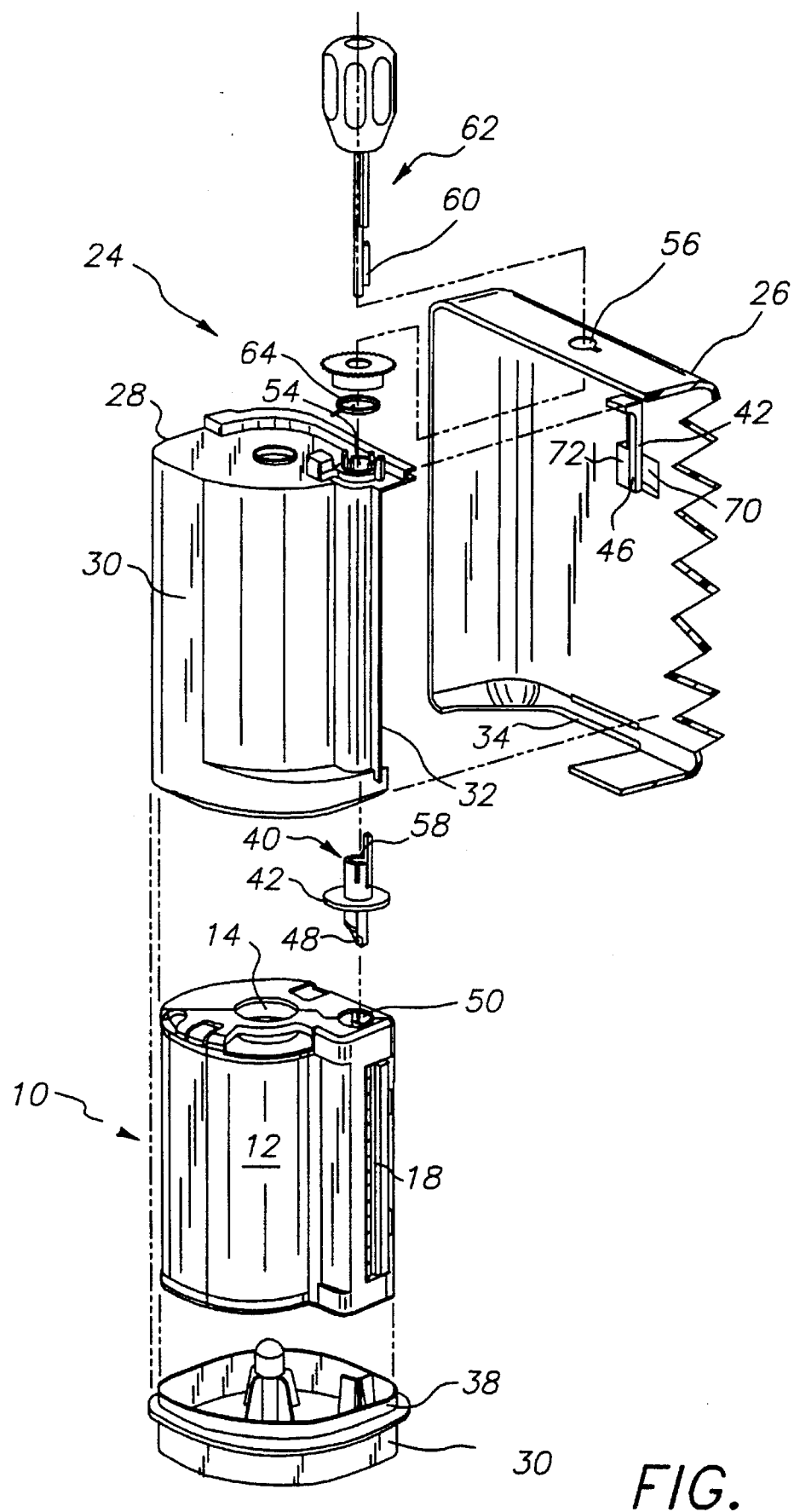

Alternate Embodiment (FIGS. 4-6)

FIGS. 4-6 show an alternate embodiment of the camera 24. Substantially the same reference numbers as used in FIGS. 1-3 are used in FIGS. 4-6. Thus, the description of the alternate embodiment is limited to a description of its operation (as contrasted to the operation of the preferred embodiment of the camera 24).

Operation

Going from FIG. 4 to FIG. 5, it can be seen that when the trailing film end portion 22 is wound into the cassette shell 12, the return torsion spring 64 that biases the sensor head 46 of the film sensor lever 44 against the trailing film end portion urges the actuator unit 40 to rotate counter-clockwise in FIG. 2. Consequently, the film sensor lever 44 is similarly rotated to pivot its sensor head 46 into an interior curved cavity 70 ( about 40% wider than the cavity 66 in FIG. 1) in the rear cover 26 and against a far-end wall 72 of the cavity, the drive-part 48 is similarly rotated to pivot the light lock 18 completely closed (100%), and the key-part 52 is similarly rotated to align its drive hole 58 with the ingress opening 56. The far-end wall 72 of the cavity 70 acts as a stop to limit rotation of the actuator unit 42, in order to align the drive hole 58 with the ingress opening 56.

Since the drive hole 58 is aligned with the ingress opening 56, the keyed forward end 60 of the tool 62 can now be manually inserted completely through the ingress opening 56 and into the drive hole 58. Then, the tool 62 is manually pushed downward to force the driver 42 out of the cassette chamber 30 with the film cassette 10 through the bottom opening 34. The film cassette 10 is pushed against the bottom lid 36 to pop the bottom lid away from the bottom opening 34. The film sensor lever 44 (whose sensor head 46 is against the far-end wall 72 of the cavity 70) is broken away from the driver 42 at the weakened interconnection 68 when the driver is initially pushed downward. See FIG. 6.

The invention has been described with reference to a preferred embodiment. However, it will be appreciated that variations and modifications can be effected by a person of ordinary skill in the art without departing from the scope of the invention.

PARTS LIST

| | | |
|---|---|---|
| 10. | film cassette | |
| 12. | cassette shell | |
| 14. | flanged spool | |
| 16. | filmstrip | |
| 18. | light lock | |
| 20. | slot | |
| 22. | trailing film end portion | |
| 24. | camera | |
| 26. | rear cover | |
| 28. | chamber cover | |
| 30. | cassette chamber | |
| 32. | slot | |
| 34. | bottom opening | |
| 36. | bottom lid | |
| 38. | peripheral lip | |
| 40. | actuator unit | |
| 42. | driver | |
| 44. | film sensor lever | |
| 46. | sensor head | |
| 48. | drive-part | |
| 50. | axial end | |
| 52. | key-part | |
| 54. | top opening | |
| 56. | ingress opening | |
| 58. | drive hole | |
| 60. | keyed forward end | |
| 62. | tool | |
| 64. | return spring | |
| 66. | cavity | |
| 68. | weakened interconnection | |
| 70. | cavity | |
| 72. | far end-wall | |

We claim:

1. A camera for use with a film cassette having a movable light lock supported within a film egress/ingress slot to be moved closed after a filmstrip is wound into the cassette, comprises a cassette-receiving chamber, and a movable driver to be moved to close the light lock before the cassette is removed from said chamber, and is characterized in that:

an exterior ingress opening to said chamber is provided to admit an insertion tool into the chamber to push the cassette out of the chamber;

said driver has a weakened portion and is located for the tool to push the driver to force the cassette out of said chamber; and fixed means is located to break said weakened portion during movement of said driver, whereby said camera will be disabled.

2. A camera as recited in claim 1, wherein said fixed means breaks said weakened portion when said driver is moved to close the light lock.

3. A camera as recited in claim 1, wherein said fixed means breaks said weakened portion as said driver is pushed to force the cassette out of said chamber.

4. A camera as recited in claim 1, wherein film sensor means for sensing the presence of the filmstrip outside the cassette, proximate the slot, and for sensing the absence of the filmstrip outside the cassette once the filmstrip is wound into the cassette is connected to said driver at said weakened portion to permit the driver to be moved to close the light lock in response to the film sensing means sensing the absence of the filmstrip and to separate from the film sensing means when the weakened portion is broken.

5. A camera as recited in claim 1, wherein said driver is engaged with the light lock for the tool to push the driver out of said chamber with the cassette.

* * * * *